US012266492B2

(12) United States Patent
Wyatt et al.

(10) Patent No.: US 12,266,492 B2
(45) Date of Patent: Apr. 1, 2025

(54) SYSTEM AND METHOD FOR SETTING A WEAR ALLOWANCE OF AN ELECTRICAL CONTACTOR

(71) Applicant: SAFRAN POWER USA, LLC, Twinsburg, OH (US)

(72) Inventors: Christopher Wyatt, Twinsburg, OH (US); Dean Morgan, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 172 days.

(21) Appl. No.: 18/250,025

(22) PCT Filed: Oct. 23, 2020

(86) PCT No.: PCT/US2020/057023
§ 371 (c)(1),
(2) Date: Apr. 21, 2023

(87) PCT Pub. No.: WO2022/086552
PCT Pub. Date: Apr. 28, 2022

(65) Prior Publication Data
US 2023/0386773 A1 Nov. 30, 2023

(51) Int. Cl.
*H01H 50/34* (2006.01)

(52) U.S. Cl.
CPC .................................. *H01H 50/34* (2013.01)

(58) Field of Classification Search
CPC ........................... H01H 71/4763; H01H 50/34
(Continued)

(56) References Cited

U.S. PATENT DOCUMENTS 749,814 A * 1/1904 Downs ................. H01H 50/546
335/132
3,806,850 A 4/1974 McFarlin
(Continued)

FOREIGN PATENT DOCUMENTS

CA 645356 A 7/1962
EP 3171384 A1 5/2017

OTHER PUBLICATIONS

International Search Report, International Application No. PCT/US2020/057023 dated Jul. 21, 2021, 2 pages.

*Primary Examiner* — Alexander Talpalatski
(74) *Attorney, Agent, or Firm* — Kilpatrick Townsend & Stockton LLP

(57) ABSTRACT

An electrical contactor that includes separable contacts that include a first pair of mating contacts and a second pair of mating contacts. The electrical contactor also includes a first portion that includes the first pair of mating contacts and a solenoid plunger that is configured to receive a plunger rod; The electrical contactor additionally includes a second portion that includes the second pair of mating contacts. The plunger rod is configured to be inserted within the solenoid plunger and rotated towards the second portion to be threaded into the second portion to enable the second portion to be pulled up towards the first portion. The second pair of mating contacts are configured to move closer to the first pair of mating contacts until the second pair of mating contacts mate with the first pair of mating contacts to increase a wear allowance to a predetermined desired level.

20 Claims, 6 Drawing Sheets

(58) Field of Classification Search
USPC ............................ 335/197, 42, 86, 132, 258
See application file for complete search history.

(56) References Cited

U.S. PATENT DOCUMENTS

| | | | | |
|---|---|---|---|---|
| 5,004,874 | A | 4/1991 | Theisen et al. | |
| 5,374,912 | A * | 12/1994 | Houck, III ........... | H01H 50/045 335/257 |
| 6,218,921 | B1 * | 4/2001 | Eberts .................. | H01H 71/322 335/229 |
| 6,911,884 | B2 * | 6/2005 | Uotome ................. | H01H 50/36 335/132 |
| 6,956,452 | B2 * | 10/2005 | Kumar ............... | H01H 71/7463 335/176 |
| 2008/0164965 | A1 * | 7/2008 | Hoffman ............... | H01F 7/1607 335/258 |

* cited by examiner

SYSTEM AND METHOD FOR SETTING A WEAR ALLOWANCE OF AN ELECTRICAL CONTACTOR

BACKGROUND

Currently during assembly of certain electrical relays and contactors, one or multiple assembly adjustments may be required to adjust a wear allowance to be set to a desired level. This assembly process can become costly and time consuming and may require assembly and re-assembly of particular electrical relays and contactors until a desired wear allowance is reached. For example, during assembly of a contactor, the contactor may be assembled, measured, and disassembled. The contactor must be subsequently reassembled until the wear allowance is measured within an acceptable wear allowance window.

Currently, a known method for adjusting the wear allowance is to use shims that are placed above and below portions of a relay/contactor. The relay/contactor is assembled and then the wear allowance is measured. If the desired wear allowance is not measured (e.g., the measured wear allowance is too high or too low), the contactor must be disassembled and the shims must be adjusted. The contactor is subsequently reassembled and the wear allowance must be re-measured. This process may need to be repeated until the desired wear allowance is measured resulting in an inefficient, an expensive, and a difficult assembly process.

SUMMARY

In view of the foregoing, an electrical contactor is disclosed that includes separable contacts that include a first pair of mating contacts and a second pair of mating contacts. The second pair of mating contacts are initially separated from the first pair of mating contacts. The electrical contactor also includes a first portion of the electrical contactor that includes the first pair of mating contacts and a solenoid plunger that is configured to receive a plunger rod. The plunger rod is configured to be inserted within the solenoid plunger and rotated towards a second portion of the electrical contactor. The second portion of the electrical contactor includes the second pair of mating contacts. Upon a requisite rotation of the plunger rod, the plunger rod is threaded into the second portion of the electrical contactor and enables the second portion of the electrical contactor to be pulled up towards the first portion of the electrical contactor. The second pair of mating contacts are configured to move closer to the first pair of mating contacts until the second pair of mating contacts mate with the first pair of mating contacts to increase a wear allowance to a predetermined desired level.

Another example of an electrical contactor is disclosed that includes a solenoid plunger that is disposed within an upper housing portion of the electrical contactor. The upper housing portion includes a pair of stationary mating contacts that are fixed to the upper housing portion. The electrical contactor also includes a plunger rod that is configured to be inserted and rotated within the solenoid plunger to travel downward along a longitudinal axis. The plunger rod is lowered within the solenoid plunger and includes a lower threaded portion.

The electrical contactor additionally includes a plunger base that is initially separated from the upper housing portion and which includes a threaded insert that is configured to accept the lower threaded portion of the plunger rod as the plunger rod is lowered from the solenoid plunger into the threaded insert of the plunger base to lift the plunger base upwards along the longitudinal axis towards the upper housing portion of the electrical contactor. Additionally, the plunger base includes a pair of moving mating contacts that are configured to move upwards based on the upward movement of the plunger base. The pair of moving mating contacts are pulled upwards to allow mating with the pair of stationary mating contacts to increase a wear allowance to a desired level.

According to another aspect, a method for setting a wear allowance of an electrical contactor is disclosed that includes inserting a plunger rod within a solenoid plunger that is disposed within an upper housing portion of the electrical contactor. The upper housing portion includes a pair of stationary mating contacts. The method also includes turning the plunger rod to rotate downward through the solenoid plunger along a longitudinal axis towards a plunger base of the electrical contactor. The plunger base includes a pair of moving mating contacts.

The method additionally includes raising the plunger base upward along the longitudinal axis towards the upper housing portion of the electrical contactor. The plunger base includes a threaded insert that is configured to accept a lower threaded portion of the plunger rod as its rotated and threaded to the threaded insert and the plunger base is raised based on the downward rotation of the plunger rod and the pair of moving mating contacts are configured to move upwards towards the pair of stationary mating contacts. The method further includes setting the wear allowance of the electrical contactor based on a mating of the pair of moving mating contacts with the pair of stationary mating contacts. The mating of the pair of moving mating contacts and the pair of stationary mating contacts occurs as the plunger rod is further rotated within the threaded insert of the plunger base.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
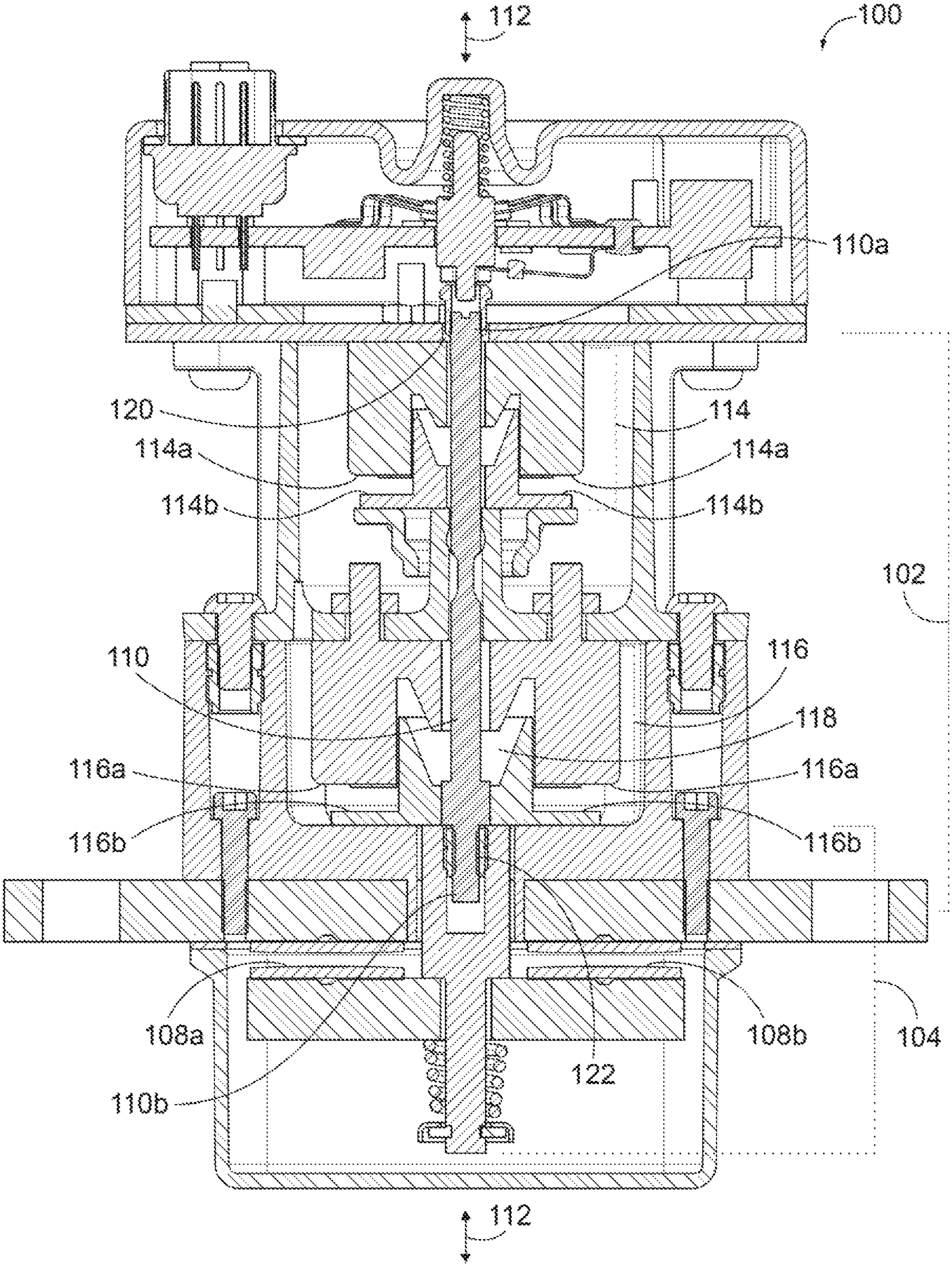
FIG. 1 is a cross-sectional elevation view of an electrical contactor according to an exemplary embodiment of the present disclosure.

FIG. 1 is a cross-sectional elevation view of an electrical contactor (contactor) 100 according to an exemplary embodiment of the present disclosure. For purposes of this disclosure the functionality of a solution for allowing wear allowance to be set during an initial assembly of the contactor 100 will be described herein. However, it is to be appreciated that the present disclosure and the functionality of the solution for allowing wear allowance to be set may additionally or alternatively be applied during an initial assembly of an electrical relay (not shown).

With continued reference to FIG. 1, the contactor 100 may include an upper housing portion (upper housing) 102 and a plunger base portion (plunger base) 104. As shown in the cross-sectional elevation view of FIG. 2, during an initial assembly stage of the contactor 100, the contactor 100 is configured to be in an expanded state of the initial assembly stage. Within the expanded state, the upper housing 102 and the plunger base 104 are separated from one another. The upper housing 102 and the plunger base 104 each include a pair of separable contacts. In particular, within the expanded state, a pair of stationary mating contacts 106*a*, 106*b* that are fixed to the upper housing 102 of the contactor 100 are separated from a pair of moving mating contacts 108*a*, 108*b* that are movable and are associated with the plunger base 104 of the contactor 100.

In one embodiment, the pair of stationary mating contacts 106*a*, 106*b* may be configured to remain in a static stationary position which is fixed to the upper housing 102. The pair of moving mating contacts 108*a*, 108*b* may be configured to be dynamically positioned based on a selectively upward movement of the associated plunger base 104 as it is raised up along a longitudinal axis 112. In particular, the pair of moving mating contacts 108*a*, 108*b* may be configured to move upwards and towards the pair of stationary mating contacts 106*a*, 106*b* based on an upward movement of the associated plunger base 104.

Figure 3:
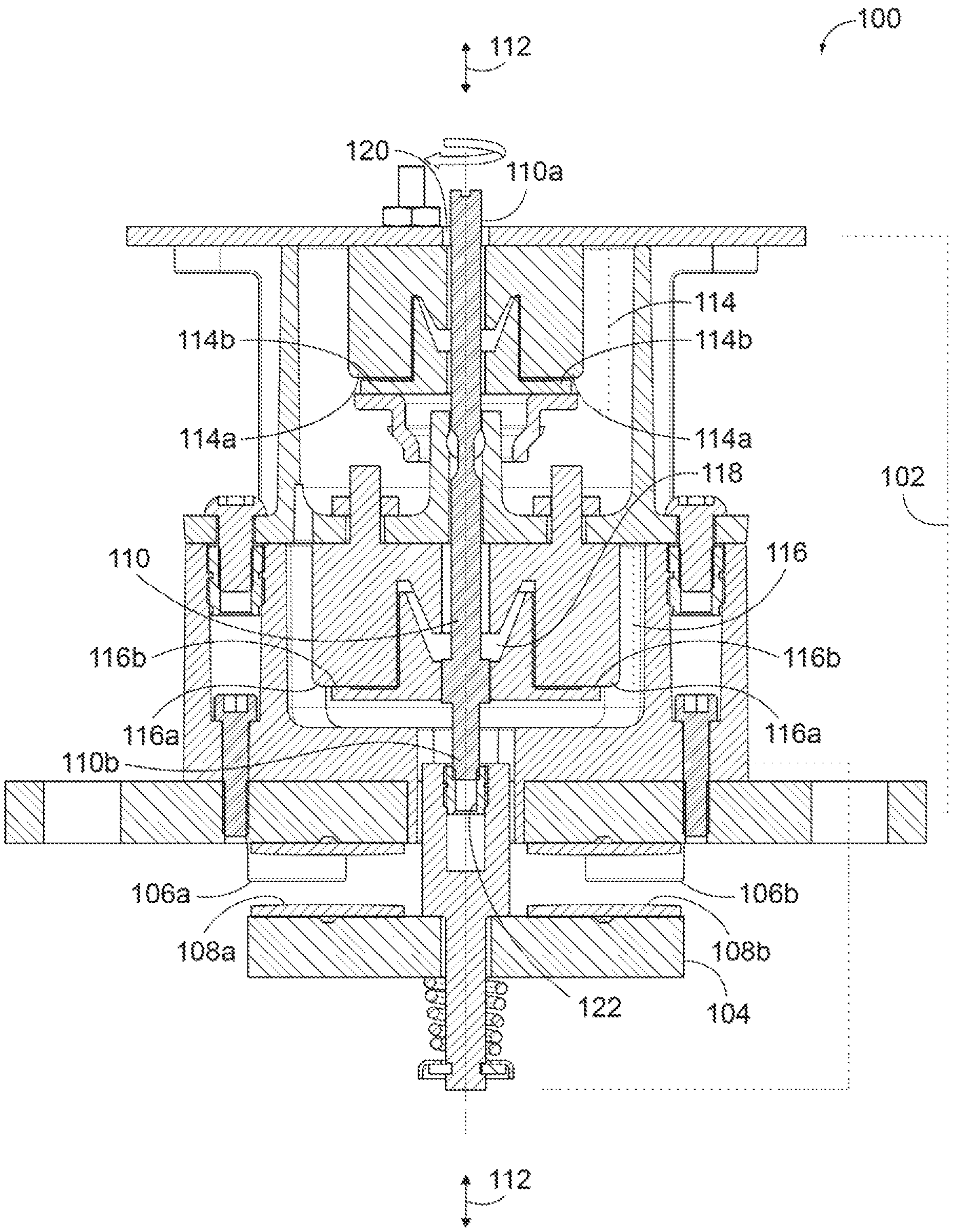
FIG. 3 is a cross-sectional elevation view of the electrical contactor in an intermediate state of the initial assembly stage of the electrical contactor according to an exemplary embodiment of the present disclosure.
Figure 4:
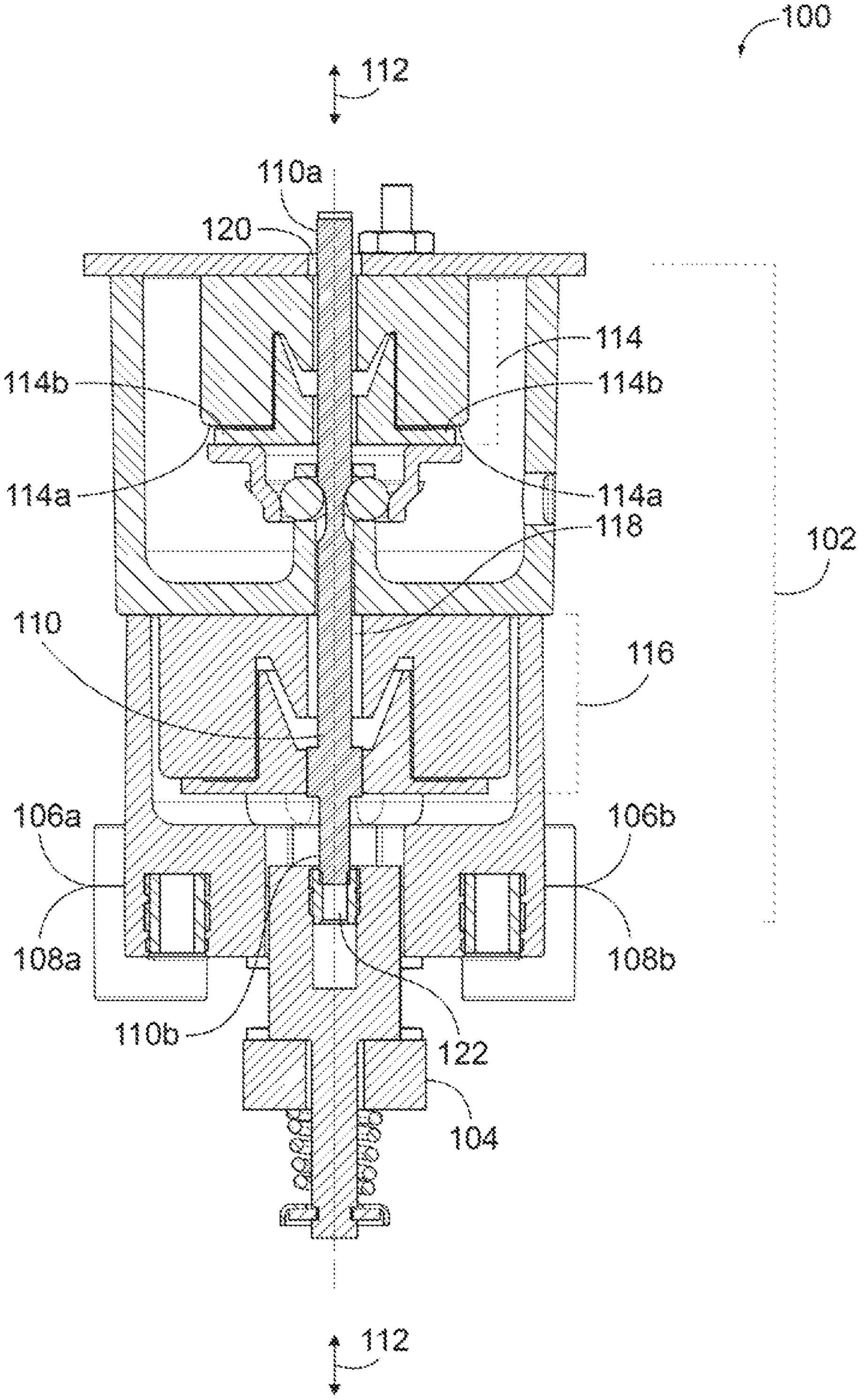
FIG. 4 is a cross-sectional elevation view of the electrical contactor in a contracted state of the initial assembly stage of the electrical contactor according to an exemplary embodiment of the present disclosure.

As discussed in more detail below (and as shown in FIG. 3 and FIG. 4), based on an insertion of a plunger rod 110 that is rotated downward to be lowered down along the longitudinal axis 112 and threaded into a pressed-in insert of the plunger base 104, the plunger base 104 may be configured to move upward towards the upper housing 102 to allow the pair of moving mating contacts 108*a*, 108*b* to move upwards towards the pair of stationary mating contacts 106*a*, 106*b*. Upon downward rotation of the plunger rod 110 to a set distance (e.g., a predetermined distance along the longitudinal axis 112), the pair of moving mating contacts 108*a*, 108*b* may mate (i.e., touch) with the pair of stationary mating contacts 106*a*, 106*b*. This functionality allows for a wear allowance to be measured and set during the initial assembly of the contactor 100.

More specifically, the plunger rod 110 may be turned and lowered to a set distance after an initial point where the mating contacts 106*a*, 108*a*, 106*a*, 108*b* mate to set a desired wear allowance of the contactor 100. Accordingly, the upper housing 102 and the plunger base 104 may be configured to include components that allow a wear allowance to be set during an initial assembly of the contactor 100 without requiring a full assembly, measurement, disassembly, and re-assembly to ensure that a desired wear allowance is measured. As such, the contactor 100 includes components that allow the desired wear allowance to be set without the use of shims that may typically be placed at particular portions of the contactor 100 (e.g., above or below moving mating contacts 108*a*, 108*b*) to adjust the wear allowance. As discussed below, this functionality may be provided by adjusting the configuration of the contactor 100 from the expanded state to an intermediate state (shown in FIG. 3) to a contracted state (shown in FIG. 4).

Figure 2:
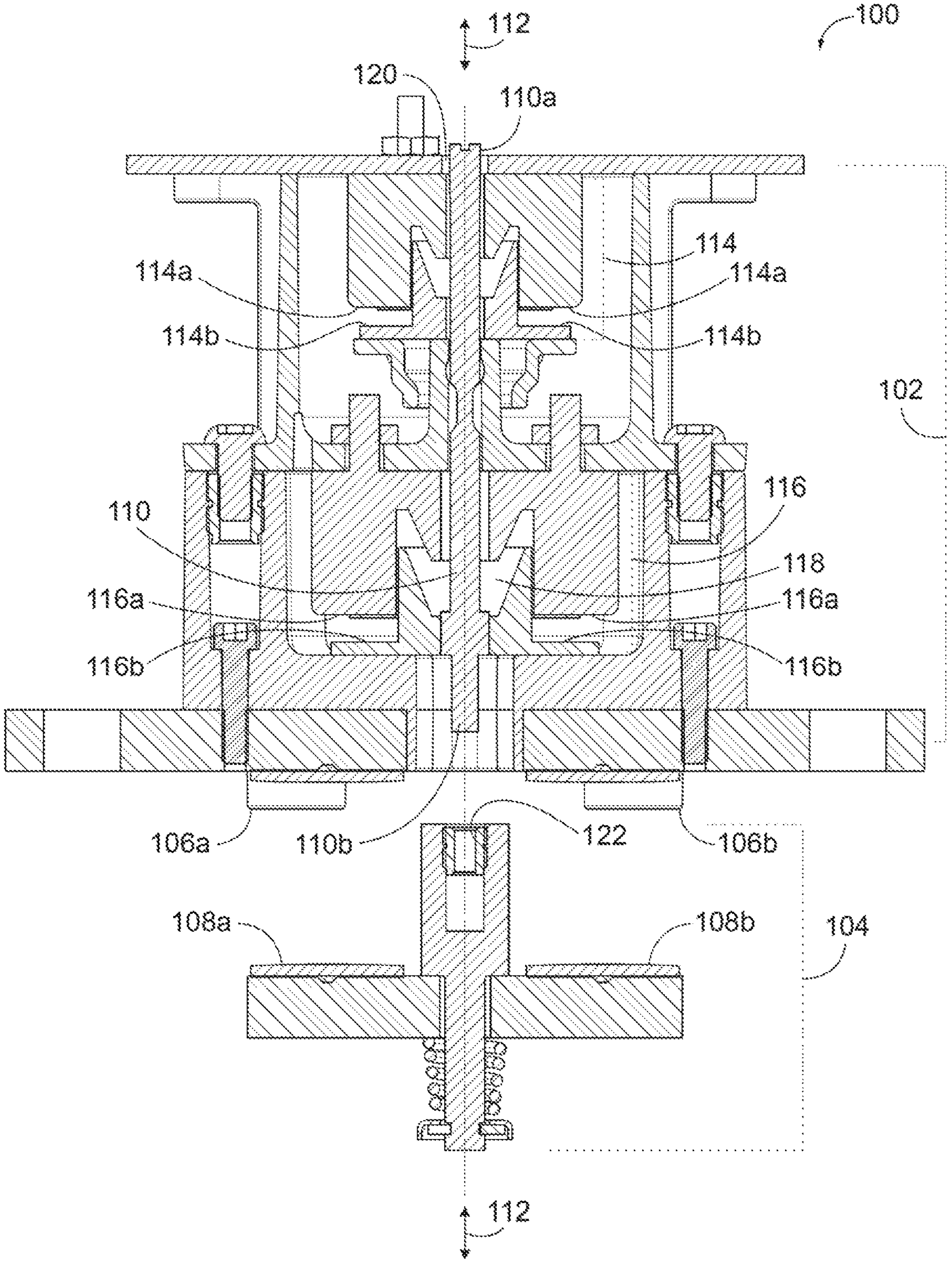
FIG. 2 is a cross-sectional elevation view of the electrical contactor in an expanded state of an initial assembly stage of the electrical contactor according to an exemplary embodiment of the present disclosure.

In an exemplary embodiment, the upper housing 102 of the contactor 100 may include an upper portion 114. The upper portion 114 may include upper mating contacts 114*a* and lower mating contacts 114*b*. The upper housing 102 of the contactor 100 may additionally include a lower portion 116. The lower portion 116 may similarly include upper mating contacts 116*a* and lower mating contacts 116*b*. As shown in FIG. 2, when the contactor 100 is configured to be in the expanded state (e.g., during an initial assembly stage), the upper portion 114 and the lower portion 116 are both in an open/OFF position. Within the open/OFF position, the upper mating contacts 114*a* are physically separated from the lower mating contacts 114*b*. Similarly, the upper mating contacts 116*a* are physically separated from the lower mating contacts 116*b*.

With continued reference to FIG. 1 and FIG. 2, a solenoid plunger 118 may be disposed within the upper housing 102 of the contactor 100. In one configuration, the solenoid plunger 118 may include a socket 120 that may include a plurality of side walls that are configured as a circular hollow receptacle that may be shaped and sized to receive the plunger rod 110. In one configuration, the plurality of side walls of the solenoid plunger 118 may include a cylindrical coil of wire acting as a magnet that may carry electric current. In one embodiment, the plunger rod 110 may be configured as a rod shaped object that is configured to be lowered down along the longitudinal axis 126 within the socket 120 through the solenoid plunger 118 of the upper housing 102 to be rotated towards the plunger base 104 of the contactor 100.

In one configuration, one or more portions of the plunger rod 110 may be made of electrically insulative material. Additionally or alternatively, one or more portions of the plunger rod 110 may be made of electrically conductive material. An upper portion 110*a* of the plunger rod 110 may include a slotted head that may be configured to receive a tool (e.g., flat head screw driver bit) that may be operably controlled to turn and push the plunger rod 110 down along the longitudinal axis 126 within the socket 120 of the solenoid plunger 118 to be rotated towards the plunger base 104 of the contactor 100.

In alternate configurations, the upper portion 110*a* of the plunger rod 110 may include various types of head configurations (e.g., Phillips, Coin-slot, Torq-set, Fearson, etc.) that may be configured to receive a respective tool bit that may be operably controlled to turn and push the plunger rod 110 down the socket 120 of the solenoid plunger 118 to be rotated towards the plunger base 104. Accordingly, the plunger rod 110 may be turned to be rotated at a 360° rotation down along the longitudinal axis 112 to travel towards the plunger base 104 of the contactor 100 while performing required functions at any rotational position.

With particular reference to FIG. 3, as the plunger rod 110 is rotated and travels down the solenoid plunger 118 of the upper housing 102 along the longitudinal axis 126, a state of the contactor 100 may be modified from the expanded state to the intermediate state (e.g., over a period of time of rotation of the plunger rod 110) of the initial assembly stage of the contactor 100. Within the intermediate state, the plunger rod 110 may reach a threaded insert 122 of the plunger base 104.

Figure 5:
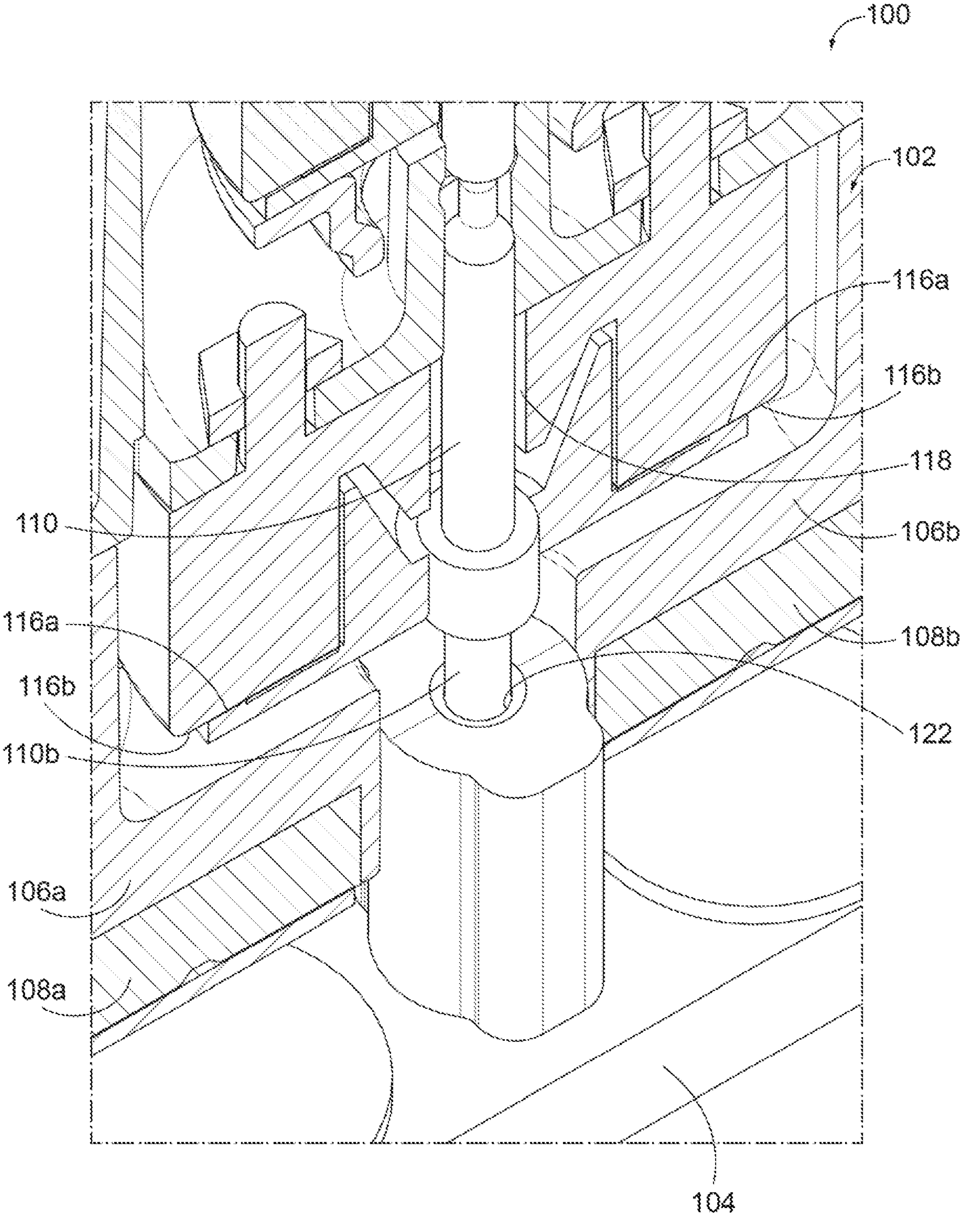
FIG. 5 is a close-up cross-sectional perspective view of a plunger rod inserted into a plunger base of the electrical contactor according to an exemplary embodiment of the present disclosure.

As shown in FIG. 5, the plunger rod 110 may be further rotated and lowered to be inserted within the threaded insert 122 of the plunger base 104. In an exemplary embodiment, a lower portion 110*b* of the plunger rod 110 may include a male threaded portion that is configured to be rotated to be placed into the threaded insert 122 of the plunger base 104 of the contactor 100. Upon insertion of the plunger rod 110 within the socket 120 of the solenoid plunger 118 and continued downward rotation of the plunger rod 110 within the solenoid plunger 118, the tool may be operably controlled to continue to turn the plunger rod 110 to rotate at a 360° rotation and push the plunger rod 110 down along the longitudinal axis 126 to be rotated towards the threaded insert 122 of the plunger base 104.

The threaded insert 122 may be configured as a pressed-in threaded insert that is includes female threaded side walls that are configured as a circular hollow receptacle that may be shaped and sized to receive the male threaded portion of the lower portion 116*c* of the plunger rod 110. The configuration of the solenoid plunger 118 and the plunger base 104 itself may disallow rotation of the plunger base 104. Accordingly, the plunger base 104 maybe pulled upward to be risen up along the longitudinal axis 112 towards the upper housing 102 of the contactor 100 as the plunger rod 110 is rotated downward through and within the threaded insert 122 of the plunger base 104.

More specifically, with reference again to FIG. 3, within the intermediate state, as the plunger rod 110 is lowered and pressed into the solenoid plunger 118, the 360° rotation of the plunger rod 110 allows the male threaded portion of the lower portion 116*c* to be threaded to the female threaded side walls of the solenoid plunger 118 of the plunger base 104. Accordingly, the plunger base 104 may begin to move in a longitudinal/upward fashion as the plunger rod 110 is lowered through the solenoid plunger 118 and further into plunger base 104. As such, the plunger base 104 is raised up along the longitudinal axis 126 toward the upper housing 102 of the contactor 100. Consequently, the pair of moving mating contacts 108*a*, 108*b* are moved upwards towards the pair of stationary mating contacts 106*a*, 106*b*.

With particular reference to FIG. 4, as the plunger rod 110 is rotated and travels further down along the longitudinal axis 126 through the socket 120 of the upper housing 102 and is further rotated into the threaded insert 122 of the plunger base 104, a state of the contactor 100 is modified (e.g., over a period of time of rotation of the plunger rod 110) from the intermediate state to the contracted state of the initial assembly stage of the contactor 100. In particular, during this modification of states, the plunger base 104 of the contactor 100 is configured to continue to move upward towards the upper housing 102 of the contactor 100.

Since the plunger base 104 does not rotate based on the rotation of the plunger rod 110, the plunger base 104 is further pulled up to move upwards towards the upper housing 102. In other words, the plunger base 104 is raised based on the rotational lowering of the plunger rod 110 as it continues to be lowered within the threaded insert 122 of the plunger base 104. Accordingly, the plunger base 104 is raised up along the longitudinal axis 126 toward the upper housing 102 of the contactor 100 such that the pair of moving mating contacts 108*a*, 108*b* are moved further towards the pair of stationary mating contacts 106*a*, 106*b*.

As represented in FIG. 5, this functionality allows the mating contacts 106*a*, 108*a*, 106*b*, 108*b* to mate. In particular, the pair of moving mating contacts 108*a*, 108*b* may be configured to move upwards towards the pair of stationary mating contacts 106*a*, 106*b* based on the upward movement of the plunger base 104 such that the pair of stationary mating contacts 106*a*, 106*b* and the pair of moving mating contacts 108*a*, 108*b* mate with one another. Within the contracted state, the contactor 100 may be put into a closed/ON position. This allows for an initial touch of the pair of moving mating contacts 108*a*, 108*b* and the pair of stationary mating contacts 106*a*, 106*b* to be monitored and the wear allowance to be set to a desired level.

Within the closed/ON position, the upper mating contacts 114*a* are also physically connected with the lower mating contacts 114*b*. Similarly, the upper mating contacts 116*a* are physically connected with the lower mating contacts 116*b*. In additional embodiments, an initial touch of the upper mating contacts 114*a* and lower mating contacts 114*b* may be monitored to set the wear allowance to a desired level. In yet another embodiment, an initial touch of the upper mating contacts 116*a* and lower mating contacts 116*b* may be monitored to set the wear allowance to a desired level.

As discussed above, the use of shims and post assembly adjustments are not required to increase the wear allowance to a desired level. More specifically, the aforementioned functionality allows the plunger rod 110 to be rotated in order to pull up the plunger base 104 to allow the pair of moving mating contacts 108*a*, 108*b* to mate with the pair of stationary mating contacts 106*a*, 106*b* as the plunger rod 110 is rotated to a particular amount to thereby increase the wear allowance to a desired level without the use of shims and/or without the need for post assembly adjustments (e.g., after the initial assembly of the contactor 100).

The plunger rod 110 and plunger base 104 configuration may allow for the wear allowance to be set to a desired level during the initial assembly stage thereby eliminating inefficient, expensive, and difficult assembly, measurement, disassembly, and reassembly of the contactor 100 that may be otherwise required. Based on the design of the electrical contactor 100 the initial touch of the mating contact may be monitored to allow the wear allowance to be set at the desired level due to the lowering of the plunger rod 110 and the upward movement of the plunger base 104. This functionality may allow the contactor 100 to be configured within an acceptable wear allowance window that may be consistent with the wear allowances of additional contactors that are assembled by a particular manufacturer.

Figure 6:
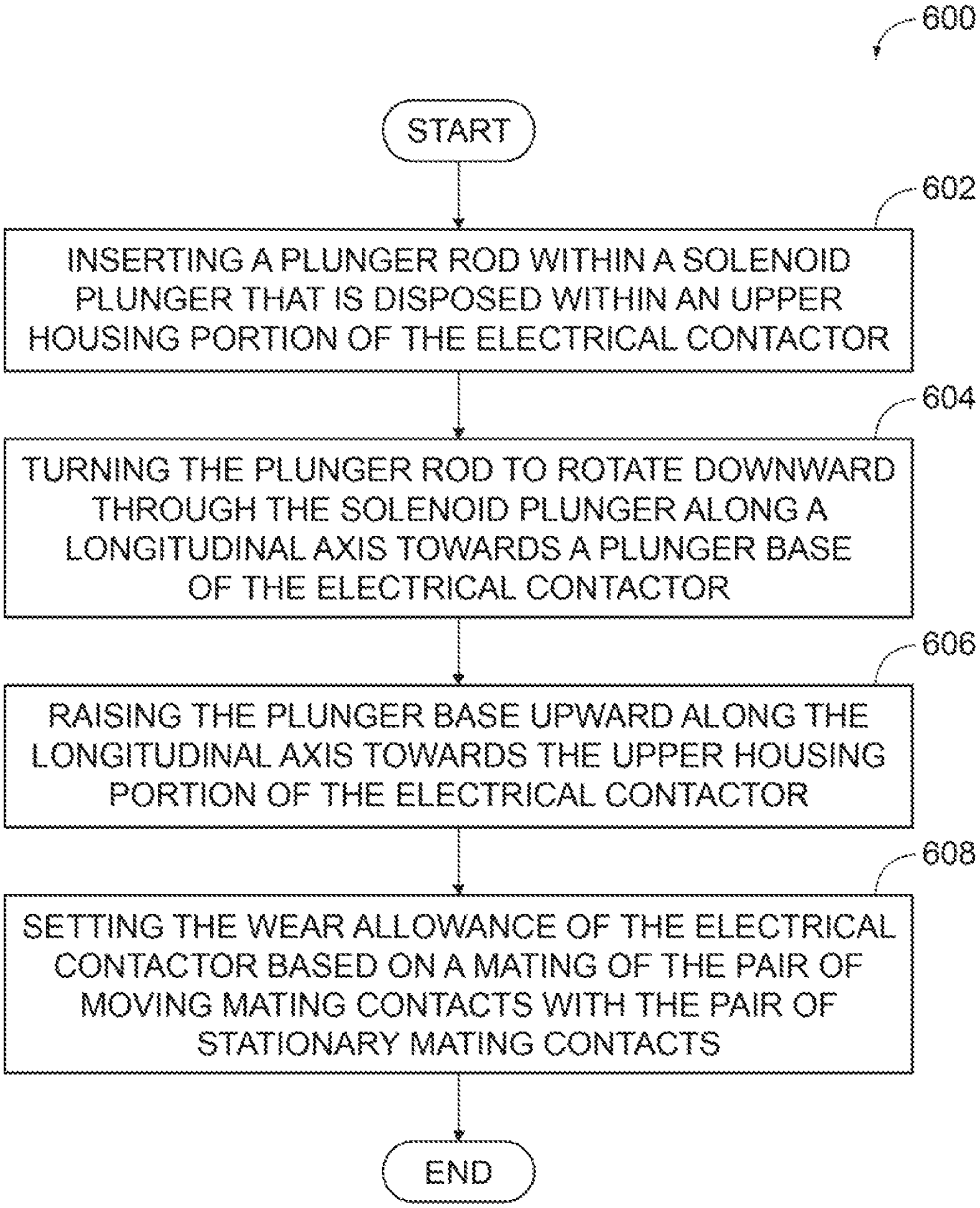
FIG. 6 is a method for setting a wear allowance of an electrical contactor according to an exemplary embodiment of the present disclosure.

FIG. 6 is a process flow diagram of a method 600 for setting a wear allowance of the electrical contactor 100 according to an exemplary embodiment of the present disclosure. FIG. 6 will be described with reference to the components of FIG. 1 through FIG. 5, though it is to be appreciated that the method 600 of FIG. 6 may be used with other components. The method 600 may begin at block 602, wherein the method 600 may include inserting a plunger rod 110 within a solenoid plunger 118 that is disposed within an upper housing 102 of the electrical contactor 100. In an exemplary embodiment, the upper housing 102 includes a pair of stationary mating contacts 106*a*, 106*b*.

The method 600 may proceed to block 604, wherein the method 600 may include turning the plunger rod 110 to rotate downward through the solenoid plunger 118 along the longitudinal axis towards a plunger base 104 of the electrical contactor 100. In one embodiment, the plunger base 104 includes a pair of moving mating contacts 108*a*, 108*b*. The method 600 may proceed to block 606, wherein the method 600 may include raising the plunger base 104 upward along the longitudinal axis towards the upper housing 102 of the electrical contactor 100. In one or more embodiments, the plunger base 104 includes a threaded insert 122 that is configured to accept a lower threaded portion of the plunger rod 110 as its rotated and threaded to the threaded insert 122. As discussed above, the plunger base 104 is raised based on the downward rotation of the plunger rod 110 and the pair of moving mating contacts 108*a*, 108*b* are configured to move upwards towards the pair of stationary mating contacts 106*a*, 106*b*.

The method 600 may proceed to block 608, wherein the method 600 may include setting the wear allowance of the electrical contactor 100 based on a mating of the pair of moving mating contacts 108*a*, 108*b* with the pair of stationary mating contacts 106*a*, 106*b*. In an exemplary embodiment, the mating of the pair of moving mating contacts 108*a*, 108*b* and the pair of stationary mating contacts 106*a*, 106*b* occurs as the plunger rod 110 is further rotated within the threaded insert 122 of the plunger base 104.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A electrical contactor, comprising:

separable contacts that include a first pair of mating contacts and a second pair of mating contacts, wherein the second pair of mating contacts are initially separated from the first pair of mating contacts;

a first portion of the electrical contactor that includes the first pair of mating contacts and a solenoid plunger that is configured to receive a plunger rod;

a second portion of the electrical contactor that includes the second pair of mating contacts, wherein the plunger rod is configured to be inserted within the solenoid plunger and rotated towards the second portion, wherein upon a requisite rotation of the plunger rod, the plunger rod is threaded into the second portion of the electrical contactor and enables the second portion of the electrical contactor to be pulled up towards the first portion of the electrical contactor, wherein the second pair of mating contacts are configured to move closer to the first pair of mating contacts until the second pair of mating contacts mate with the first pair of mating contacts to increase a wear allowance to a predetermined desired level.

2. The electrical contactor of claim 1, wherein the first pair of mating contacts are stationary contacts that are fixed to the first portion of the electrical contactor, wherein the first portion of the electrical contactor is an upper housing of the electrical contactor.

3. The electrical contactor of claim 2, wherein the second pair of mating contacts are moving contacts that are dynamically positioned to move towards the stationary contacts based on a selectively upward movement of the second portion of the electrical contactor, wherein the second portion of the electrical contactor is a plunger base.

4. The electrical contactor of claim 3, wherein the plunger base includes a pressed-in threaded insert that includes female threaded side walls that are shaped and sized to receive a male threaded portion of a lower portion of the plunger rod.

5. The electrical contactor of claim 4, wherein the plunger base is configured to disallow rotation of the plunger base as the plunger rod is rotated through the pressed-in threaded insert of the plunger base to allow the plunger base to be pulled upward towards the upper housing of the electrical contactor as the plunger rod is rotated downward through and within the pressed-in threaded insert.

6. The electrical contactor of claim 4, wherein the upper housing portion includes an upper portion and a lower portion, wherein the upper portion includes upper mating contacts and lower mating contacts and the lower portion includes upper mating contacts and lower mating contacts.

7. The electrical contactor of claim 6, wherein the electrical contactor is an OFF position during an initial assembly stage of an assembly of the electrical contactor, wherein within the OFF position the upper mating contacts are separated from the lower mating contacts of the upper portion and the lower portion of the upper housing.

8. The electrical contactor of claim 6, wherein the electrical contactor is an ON position upon the mating of the second pair of mating contacts with the first pair of mating contacts, wherein within the ON position the upper mating contacts are connected with the lower mating contacts of the upper portion and the lower portion of the upper housing.

9. A electrical contactor, comprising:

a solenoid plunger that is disposed within an upper housing portion of the electrical contactor, wherein the upper housing portion includes a pair of stationary mating contacts that are fixed to the upper housing portion;

a plunger rod that is configured to be inserted and rotated within the solenoid plunger to travel downward along a longitudinal axis, wherein the plunger rod is lowered within the solenoid plunger and includes a lower threaded portion;

a plunger base of the electrical contactor that is initially separated from the upper housing portion, wherein the plunger base includes a threaded insert that is configured to accept the lower threaded portion of the plunger rod, wherein the plunger rod is lowered from the solenoid plunger into the threaded insert of the plunger base to lift the plunger base upwards along the longitudinal axis towards the upper housing portion of the electrical contactor, wherein the plunger base includes a pair of moving mating contacts that are configured to move upwards based on the upward movement of the plunger base, wherein the pair of moving mating contacts are pulled upwards to allow mating with the pair of stationary mating contacts to increase a wear allowance to a desired level.

10. The electrical contactor of claim 9, wherein the solenoid plunger includes a socket that includes a plurality of side walls that are configured as a circular hollow receptacle and are shaped to receive the plunger rod.

11. The electrical contactor of claim 10, wherein the plunger rod includes an upper portion that includes a slotted head that is configured to receive a tool that is operably controlled to turn and push the plunger rod down along the longitudinal axis within the socket of the solenoid plunger to be rotated towards the plunger base.

12. The electrical contactor of claim 11, wherein the plunger rod is turned to be rotated at a 360° rotation down along the longitudinal axis to travel towards the plunger base based on turning of the tool, wherein upon rotation of the plunger rod through the threaded insert the plunger base is moved closer in position to the upper housing portion of the electrical contactor.

13. The electrical contactor of claim 10, wherein the plunger base is configured to disallow rotation of the plunger base as the plunger rod is rotated through the threaded insert of the plunger base to allow the plunger base to be pulled upward towards the upper housing of the electrical contactor as the plunger rod is rotated downward within the threaded insert.

14. The electrical contactor of claim 10, wherein based on the lowering of the plunger rod and the upward movement of the plunger base, an initial touch of the pair of moving mating contacts and the pair of stationary mating contacts is utilized to allow the wear allowance to be set at the desired level.

15. The electrical contactor of claim 10, wherein the plunger rod is turned and lowered to a set distance after an initial point where the pair of moving mating contacts and the pair of stationary mating contacts mate to allow the wear allowance to be set at the desired level.

16. A method for setting a wear allowance of an electrical contactor comprising:

inserting a plunger rod within a solenoid plunger that is disposed within an upper housing portion of the electrical contactor, wherein the upper housing portion includes a pair of stationary mating contacts;

turning the plunger rod to rotate downward through the solenoid plunger along a longitudinal axis towards a plunger base of the electrical contactor, wherein the plunger base includes a pair of moving mating contacts;

raising the plunger base upward along the longitudinal axis towards the upper housing portion of the electrical contactor, wherein the plunger base includes a threaded insert that is configured to accept a lower threaded portion of the plunger rod as its rotated and threaded to the threaded insert, wherein the plunger base is raised based on the downward rotation of the plunger rod and the pair of moving mating contacts are configured to move upwards towards the pair of stationary mating contacts; and setting the wear allowance of the electrical contactor based on a mating of the pair of moving mating contacts with the pair of stationary mating contacts, wherein the mating of the pair of moving mating contacts and the pair of stationary mating contacts occurs as the plunger rod is further rotated within the threaded insert of the plunger base.

17. The method of claim 16, wherein turning the plunger rod to rotate downward through the solenoid plunger along the longitudinal axis includes turning the plunger rod at a 360° rotation down along the longitudinal axis to travel towards the plunger base, wherein upon rotation of the plunger rod through the threaded insert the plunger base is moved closer in position to the upper housing portion of the electrical contactor.

18. The method of claim 16, wherein raising the plunger base upward along the longitudinal axis towards the upper housing portion of the electrical contactor includes disallowing rotation of the plunger base as the plunger rod is rotated through the threaded insert of the plunger base to allow the plunger base to be pulled upward towards the upper housing of the electrical contactor as the plunger rod is rotated downward within the threaded insert.

19. The method of claim 16, wherein setting the wear allowance of the electrical contactor includes monitoring an initial touch of the pair of moving mating contacts and the pair of stationary mating contacts to allow the wear allowance to be set at a desired level.

20. The method of claim 16, wherein setting the wear allowance of the electrical contactor includes turning and lowering the plunger rod to a set distance after an initial point where the pair of moving mating contacts and the pair of stationary mating contacts mate to allow the wear allowance to be set at a desired level.

* * * * *